United States Patent Office 3,728,209
Patented Apr. 17, 1973

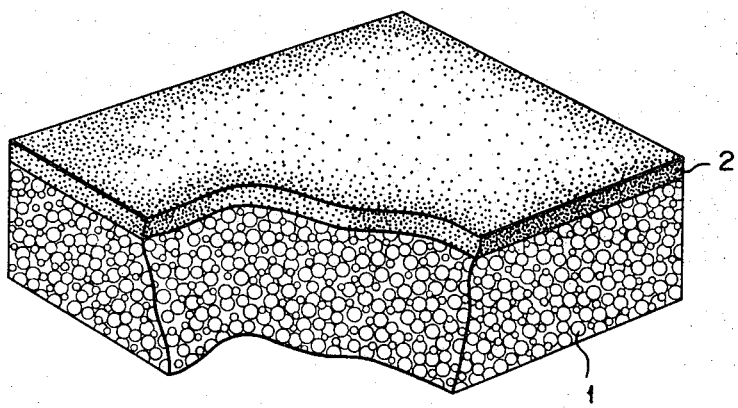

3,728,209
UNINFLAMMABLE STRUCTURAL MATERIALS
Suezo Sugaike and Masayuki Watanabe, Tokyo, and Shouzou Tanabe, Kanagawa, Japan, assignors to Tokyo Shibaura Electric Co., Ltd., Kawasaki-shi, Japan
Filed July 14, 1971, Ser. No. 162,594
Claims priority, application Japan, July 24, 1970, 45/64,358
Int. Cl. B32b 5/18
U.S. Cl. 161—160    3 Claims

ABSTRACT OF THE DISCLOSURE

Uninflammable structural materials consisting of a board member prepared from aluminum nitride, phosphoric acid and light inorganic material and a foamed member made of aluminum nitride, phosphoric acid and inorganic foaming material and integrally bonded with said board member.

BACKGROUND OF THE INVENTION

This invention relates to light uninflammable structural materials having excellent heat insulation and soundproofness.

In recent years, regulations for buildings have become more rigid mainly for the purpose of preventing the occurrence of fires immediately leading to the injury of human life. Accordingly, the primary aim of fire prevention may be eventually boiled down to the development of fully inflammable structural materials, and there is great demand for uninflammable structural materials capable of realizing visual appeal, durability and inexpensiveness. However, use for fire prevention of inorganic structural materials less capable of attaining heat insulation, soundproofness and visual appeal raise problems in indoor application, though not so prominently as outdoor fittings. Therefore, fireproof structural materials almost exclusively consist of special inorganic materials having high fireproof and heat insulating properties such as vermiculite or vitreous volcanic rock combined with organic materials such as polyurethane or epoxy resin.

Such structural materials formed of organic resins containing inorganic materials are indeed much improved in respect of fireproofness and heat insulation. However, they are simply flame-retardant, so that when heated to a higher temperature than 300 to 400° C., they are deteriorated in property by being softened or cracked and, upon exposure to flames, appreciably burn, evolving black smokes and noxious gases. To attain full uninflammability and fireproofness, therefore, structural materials should be made of 100% inorganic materials.

However, prior art uninflammable 100% inorganic structural materials including water glass or cement as a bonding agent had the drawbacks that the surface of said structural materials was acted on by free alkali released therefrom, resulting in discolorment and moreover had a considerable weight. Further, structural materials formed of inorganic materials such as gypsum or calcium silicate were undesirable in that they were very likely to crumble if a building using them should be destroyed by fire and that the manufacturing process was complicated with the resultant increased cost.

SUMMARY OF THE INVENTION

It is accordingly the object of this invention to provide light uninflammable structural materials having excellent heat resistance, weatherability, visual appeal, heat insulation and soundproofness.

Namely, uninflammable structural materials according to the invention are characterized in that they comprise a board member prepared by bonding inorganic materials using a mixture of aluminum nitride and phosphoric acid as an adhesive agent; and a foamed member consisting of aluminum nitride, phosphoric acid and inorganic foaming material. The appended drawing is a perspective view, partly in section, of an uninflammable structural material according to this invention.

DETAILED DESCRIPTION OF THE INVENTION

Uninflammable structural materials according to the invention are prepared by previously molding under pressure an unhardened board member made of a light inorganic material and a muddy binding agent consisting of aluminum nitride and phosphoric acid and bringing said board member into contact with a plastic material formed of a mixture of aluminum nitride, phosphoric acid and inorganic foaming agent so as to harden said board member at or about normal temperature and causing the plastic material to be foamed in a hardened state.

According to the invention, a foamed member having independent cells and a light and attractive board member are firmly bonded together during the hardening process by the adhesivity of the aforesaid binding agent consisting of aluminum nitride and phosphoric acid.

The attached drawing shows a general form of structural materials according to this invention. Numeral 1 denotes a foamed member made of aluminum nitride and phosphoric acid mixed with a foaming agent. 2 represents a board member formed of aluminum nitride, phosphoric acid and light inorganic material.

There will now be described the process of manufacturing uninflammable structural materials according to this invention. A composition consisting of aluminum nitride, phosphoric acid and light inorganic material has to be molded into a board. If, in this case, said composition contains an unduly large proportion of a binding agent prepared from aluminum nitride and phosphoric acid, there will occur an undesirable result due to the efflux of said binding agent. Where there is molded an unhardened board member at a pressure of, for example, 50 kg./cm.$^2$, the preferred volumetric ratio of the binding agent to a whole structural material roughly ranges between 10 and 20 percent.

It is also possible to add, if required, a volatile component such as water or alcohol so as to adjust the fluidity of said composition. The light inorganic material most suitably consists of vermiculite, obsidian, or alumina buffle, which presents a most attractive effect.

An unhardened board obtained by molding the aforementioned composition after being fully stirred and mixed is placed on the bottom of a hardening vessel. On said board is poured a viscous fluid consisting of a mixture of aluminum nitride, phosphoric acid and foaming agent so as to harden the mass at or about normal temperature. In this case, part of the fluid permeates the surface of the board and the aluminum phosphate generated by reaction between aluminum nitride and phosphoric acid acts as a strong bonding agent. Upon the hardening of the board member 2, the fluid itself is also hardened while being foamed. The ratio of aluminum nitride to phosphoric acid both contained in the fluid constituting the foamed member 1 is preferred to approximate a stoichiometrical ratio associated with the case where there is produced aluminum phosphate, a final hardened product resulting from reaction between said both components. Where the foresaid fluid has a low viscosity, there may be added fillers such as silica, alumina, mica, or silica wool to increase the viscosity. A foaming agent preferably consists of powders of metals having a great tendency toward ionization such as aluminum, magnesium and iron or powders of asbestos.

Uninflammable structural materials thus prepared according to this invention have the surface composed of an attractive board member 2, are as light as less than 1 in bulk density, present excellent heat insulation and soundproofness, and, even when exposed to a temperature of 800° C. continuously for 3 hours in the air, are neither deformed nor decreased in attractiveness.

Further, the fact that the structural materials of the invention are molded, hardened and foamed at about normal temperature extremely simplifies the manufacturing process. If, in case said structural materials are fitted to a building, there is used as an adhesive agent a separately provided composition consisting of aluminum nitride and phosphoric acid, one component of said structural materials, then there will be obtained very good results. The reason is that said adhesive agent presents a prominent adhesivity to a large number of organic and inorganic materials and eliminates the drawback accompanying the case of prior art water glass or cement as an adhesive agent, that is, prevents the surface of structural materials from being etched by free alkali released from said water glass or cement. It is also possible to incorporate pigments such as chromium oxide, titanium oxide, and ferric oxide in the composition constituting the board member 2. This permits selective application of a variety of colors.

What we claim is:

1. Uninflammable structural materials consisting of a board member prepared from aluminum nitride, phosphoric acid and light inorganic material and a foamed member made of aluminum nitride, phosphoric acid and inorganic foaming material and integrally bonded with said board member.

2. The uninflammable structural materials according to claim 1 wherein the bonding of the board member with the foamed member is effected by the adhesive action of aluminum phosphate produced by reaction between aluminum nitride and phosphoric acid, and at the time of said bonding, the board member is hardened and the foamed member is also hardened and expanded.

3. The uninflammable structural materials according to claim 1 wherein the light inorganic material is one selected from the group consisting of mica, vermiculite, obsidian and alumina buffle, and the inorganic foaming material is selected from among the powders of aluminum, magnesium, iron and asbestos.

References Cited
UNITED STATES PATENTS 2,749,233   6/1956   Malowan _____ 252—8.1
2,784,159   3/1957   Fluck et al. _____ 252—8.1

MORRIS SUSSMAN, Primary Examiner

U.S. Cl. X.R.

161—403; 106—15 FP; 252—8.1